United States Patent
Van Der Merwe et al.

(10) Patent No.: US 8,509,169 B2
(45) Date of Patent: Aug. 13, 2013

(54) METHODS AND APPARATUS TO CONFIGURE VIRTUAL PRIVATE MOBILE NETWORKS

(75) Inventors: Jacobus Van Der Merwe, New Providence, NJ (US); Deepak K. Chawla, Ocean, NJ (US); Gustavo de los Reyes, Fair Haven, NJ (US); Seungjoon Lee, Basking Ridge, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 269 days.

(21) Appl. No.: 12/966,681

(22) Filed: Dec. 13, 2010

(65) Prior Publication Data

US 2012/0147824 A1  Jun. 14, 2012

(51) Int. Cl.
*H04W 84/02* (2009.01)

(52) U.S. Cl.
USPC .......................................................... 370/329

(58) Field of Classification Search
CPC ..................................................... H04W 84/02
USPC ........................................ 370/328–338, 311
See application file for complete search history.

(56) References Cited

U.S. PATENT DOCUMENTS

| | | | |
|---|---|---|---|
| 6,016,318 A * | 1/2000 | Tomoike | 370/401 |
| 6,029,067 A | 2/2000 | Pfundstein | |
| 6,885,864 B2 | 4/2005 | McKenna et al. | |
| 6,891,842 B2 | 5/2005 | Sahaya et al. | |
| 6,976,177 B2 | 12/2005 | Ahonen | |
| 7,126,921 B2 | 10/2006 | Mark et al. | |
| 7,292,575 B2 | 11/2007 | Lemieux et al. | |
| 7,415,627 B1 * | 8/2008 | Radhakrishnan et al. | 714/4.1 |
| 7,738,891 B2 * | 6/2010 | Tenhunen et al. | 455/512 |
| 2004/0073642 A1 | 4/2004 | Iyer | |
| 2006/0083205 A1 * | 4/2006 | Buddhikot et al. | 370/338 |
| 2006/0111113 A1 * | 5/2006 | Waris | 455/441 |
| 2007/0213050 A1 * | 9/2007 | Jiang | 455/432.3 |
| 2010/0017861 A1 * | 1/2010 | Krishnaswamy et al. | 726/7 |
| 2010/0039978 A1 | 2/2010 | Rangan | |
| 2010/0284343 A1 * | 11/2010 | Maxwell et al. | 370/328 |
| 2011/0154101 A1 | 6/2011 | Merwe et al. | |
| 2012/0208506 A1 * | 8/2012 | Hirano et al. | 455/411 |
| 2012/0282924 A1 * | 11/2012 | Tagg et al. | 455/432.1 |

* cited by examiner

*Primary Examiner* — Ricky Ngo
*Assistant Examiner* — Ben H Liu
(74) *Attorney, Agent, or Firm* — Hanley, Flight & Zimmerman, LLC

(57) ABSTRACT

Methods and apparatus to configure virtual private mobile networks are disclosed. A disclosed example method includes receiving a request at a wireless network provider from a client, the request instructing the wireless network provider to create the virtual private mobile network for the client, identifying available network elements within a wireless network of the wireless network provider based on the request from the client, configuring a portion of a control plane and a portion of a data plane of the identified network elements for the virtual private mobile network, and enabling user equipment associated with the client to wirelessly communicatively couple to the virtual private mobile network.

17 Claims, 8 Drawing Sheets

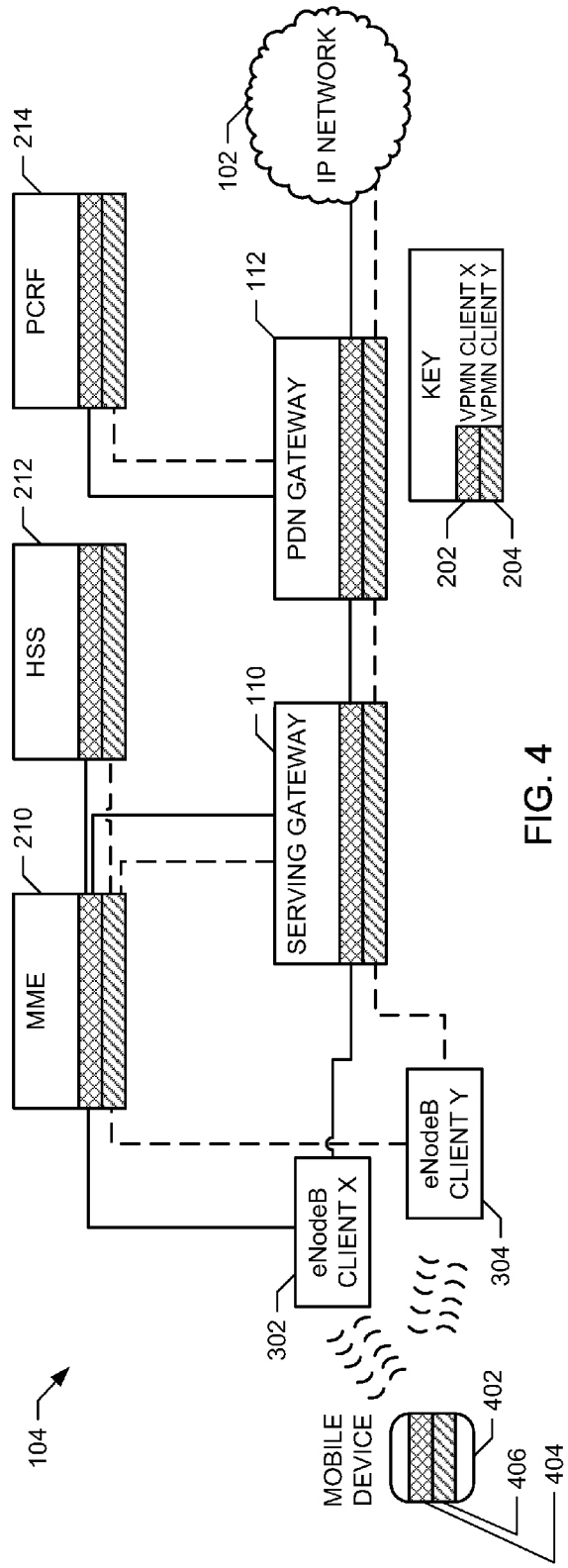
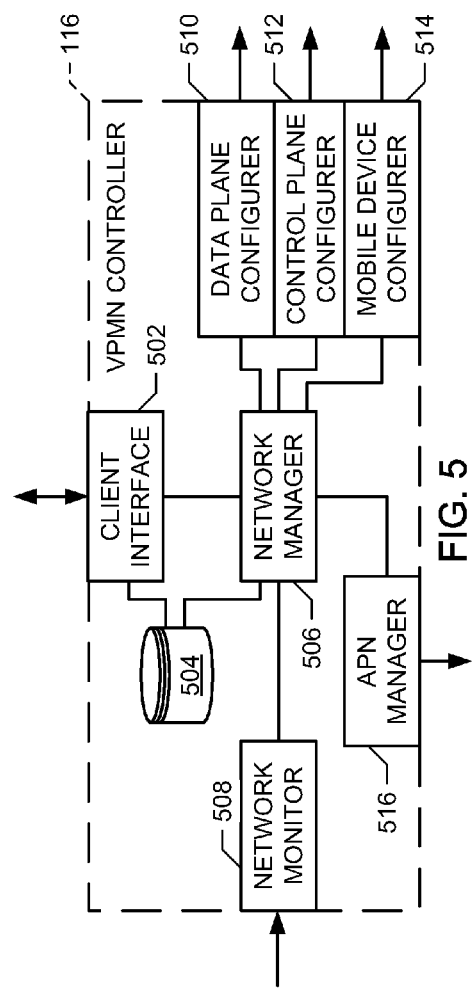
FIG. 4
FIG. 5

METHODS AND APPARATUS TO CONFIGURE VIRTUAL PRIVATE MOBILE NETWORKS

FIELD OF THE DISCLOSURE

This disclosure relates generally to mobile networks and, more particularly, to methods and apparatus to configure virtual private mobile networks.

BACKGROUND

Virtualization of computing and networking platforms is becoming popular with clients and customers by providing flexible, on demand resources at a relatively low cost. A virtualized computing network, also known as a cloud computing network, enables clients to manage web-based applications and/or data resources by dynamically leasing computational resources and associated network resources from service providers. These web-based applications, data resources, and/or routing resources may be used by customers of the clients, individuals associated with the clients, and/or by the clients. This dynamic leasing of computational and network resources creates an appearance and function of a distributive computing network and, thus, is referred to as virtualization of a network. Virtualized platforms utilize partitioning and allocation of network and/or computing resources. Accordingly, new resources provisioned for a client may be quickly added as needed within short periods of time by a network provider allocating an additional portion of shared resources to the client. Additionally, virtualization in a network enables network providers to dynamically multiplex resources among multiple clients without dedicating individual physical resources to each client.

BRIEF DESCRIPTION OF THE DRAWINGS

FIGS. 2-4 show the example wireless mobile network of FIG. 1 with example virtual private mobile networks.

FIG. 5 shows a functional diagram of the example virtual private mobile network controller of FIG. 1.

DETAILED DESCRIPTION

Figure 1:
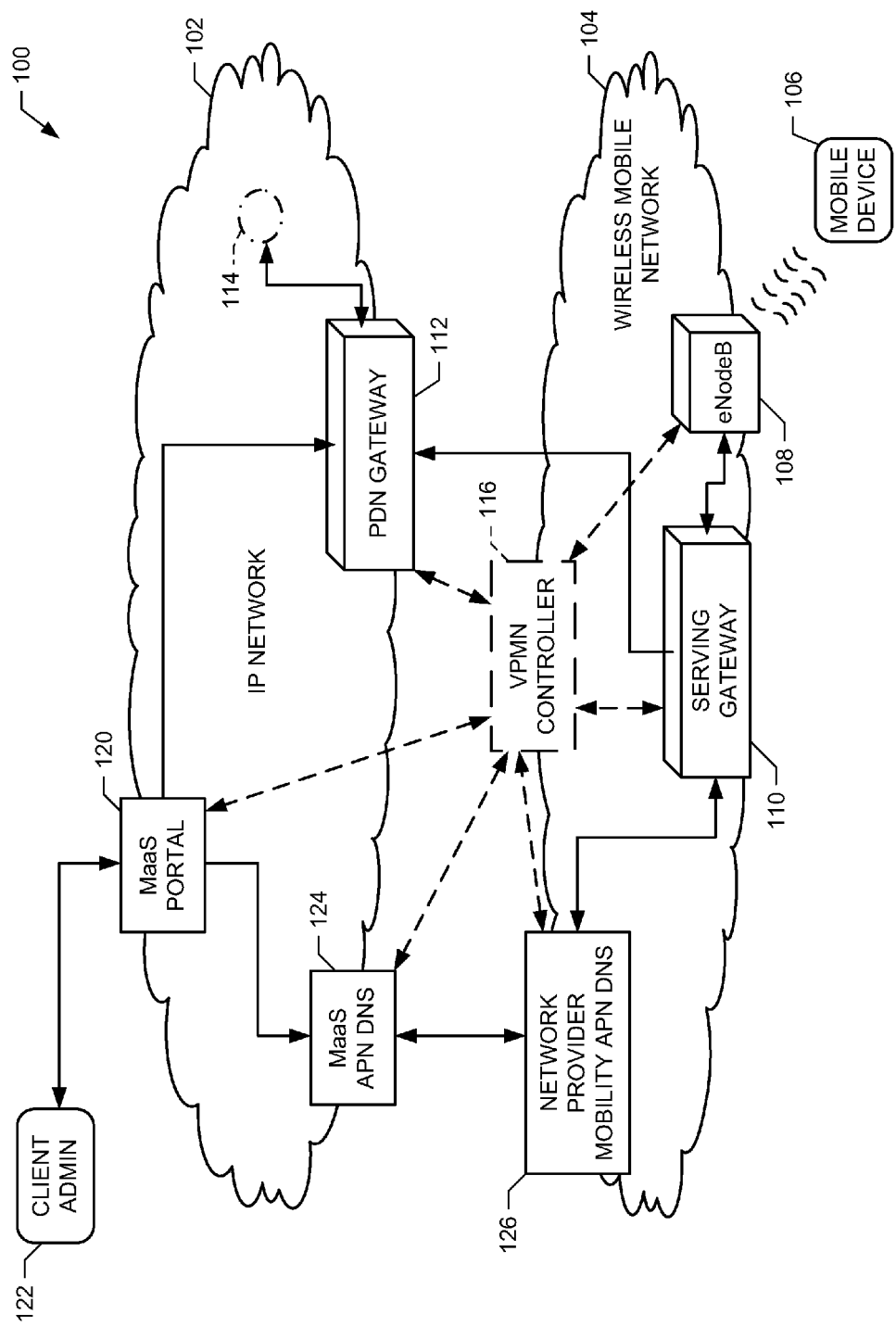
FIG. 1 is a schematic illustration of an example communication system including a wireless mobile network and a virtual private mobile network controller.

Example methods, articles of manufacture, and apparatus to configure virtual private mobile networks are disclosed. A disclosed example method includes receiving a request at a wireless network provider from a client, the request instructing the wireless network provider to create a virtual private mobile network for the client. The example method also includes identifying available network elements within a wireless network of the wireless network provider based on the request from the client and configuring a portion of a control plane and a portion of a data plane of the identified network elements for the virtual private mobile network. The example method further includes enabling user equipment associated with the client to wirelessly communicatively couple to the virtual private mobile network.

A disclosed example apparatus includes a network manager to identify available network elements within a wireless network of a wireless network provider based on a request from a client and allocate a portion of a control plane and a portion of a data plane of the identified network elements for the virtual private mobile network. The example apparatus also includes a control plane configurer to configure the portion of the control plane of the identified network elements for the virtual private mobile network and a data plane configurer to configure the portion of the data plane of the identified network elements. Further, the example apparatus includes a mobile device configurer to enable a mobile device subscribed to a service of the client to wirelessly communicatively couple to the virtual private mobile network.

Currently, mobile wireless networks enable subscribing customers to connect to an external packet switched network (e.g., the Internet) via mobile devices. These mobile wireless networks provide wireless network service via dedicated hardware (e.g., network elements known also as mobility network elements). In many instances, network elements are configured for a corresponding wireless communication protocol. Throughout the following disclosure, reference is made to network elements associated with the $3^{rd}$ Generation Partnership Project (3GPP) Long Term Evolution (LTE) wireless communication standard. However, the disclosure is applicable to network elements associated with other wireless protocols and/or standards such as, for example, the General Packet Radio Service (GPRS) for second generation (2G) and Wideband-Code Division Multiple Access (W-CDMA) based third generation (3G) wireless networks.

In a typical mobile wireless network, a base transceiver station (BTS) (e.g., a LTE eNodeB) provides wireless communication service for mobile devices in a cell (e.g., a geographic area). The BTS enables one or more wireless devices to connect to an external packet switched network through the mobile wireless network. In these typical mobile wireless networks, a BTS is communicatively coupled to a serving gateway (e.g., a wireless network interface, router, and/or server), which routes communications between multiple BTSs and a packet data network (PDN) gateway. The PDN gateway is an interface between the mobile wireless network and external packet switched networks. In other GPRS-based mobile wireless networks, the serving gateway provides similar functionality to a Serving GPRS Support Node (SGSN) and the PDN gateway provides similar functionality to a Gateway GPRS Support Node (GGSN).

Additionally, many wireless mobile networks include a mobility management entity (MME) that monitors mobile devices on a wireless mobile network and coordinates wireless handoffs between BTSs for the mobile devices. Wireless mobile networks also include home subscriber servers (HSS) (e.g., a home location register (HRL) that mange wireless device profiles and/or authentication information. Collectively, BTSs, HSSs, HRLs, PDN gateways, and/or serving gateways are referred to as network elements, which provide a foundation for providing wireless communication services for mobile devices.

To implement a wireless mobile network, a wireless mobile network provider manages and/or configures network elements. The wireless mobile network enables customers of a wireless mobile network provider to subscribe to the wireless mobile network to receive and/or transmit voice and/or data communications. Many network providers configure network elements to provide wireless service to any subscribing customer of the network provider. For example, subscribing customers of a network provider may commonly access a wireless mobile network managed by the network provider.

Additionally, many network providers lease portions of their wireless mobile network to mobile virtual network operators (MVNOs). A MVNO (e.g., Virgin Mobile) is a company that provides mobile device services but does not own, control, and/or manage its own licensed frequency allocation of a wireless spectrum and/or does not own, control, and/or manage network elements needed to create a wireless mobile network. Because network elements are capital intensive, many MVNOs desire to avoid the relatively large costs of creating and maintaining a wireless mobile network. To provide mobile device services, a MVNO leases bandwidth and/or portions of a wireless spectrum for subscribing customers of the MVNO. In this manner, a MVNO may compete with a wireless mobile network provider for customers but uses the same mobile wireless network managed by the wireless mobile network provider.

In other instances, a MVNO may be a relatively large business and/or government entity that leases a portion of a wireless mobile network for private and/or proprietary use. For example, a military may lease a portion of a wireless mobile network. In these other instances, employees, agents, and/or contractors of the MVNO use the leased portion of the wireless mobile network to communicatively couple to data centers and/or computing elements managed by the MVNO.

Currently, many wireless mobile network providers use dedicated network elements to manage wireless communications for a MVNO. These dedicated network elements are often separate from network elements used by subscribing customers of the network provider. In other instances where it may not be efficient to provide dedicated network elements for a MVNO, a wireless mobile network provider shares network resources with a MNVO. However, this sharing may result in security issues as compromises and/or denial of service attacks on a MVNO service can affect wireless service provided by the network provider. In other words, an issue with a portion of a wireless mobile network for a MVNO can develop into a larger issue for the wireless mobile network provider. Additionally, sharing and/or creating individual network resources with a MVNO creates a relatively inflexible wireless mobile network that makes realization of varying service differentiating features a difficult task for a wireless mobile network provider.

The example methods, apparatus, and articles of manufacture described herein configure a wireless mobile network by partitioning network elements to create a virtual private mobile network (VPMN) for each licensing MVNO. The example methods, apparatus, and articles of manufacture described herein enable a MVNO (e.g., a client) to request (e.g., order, specify, etc.) which portion of a wireless mobile network is to be virtualized. In response to the request, the example methods, apparatus, and articles of manufacture described herein identify available network elements to host a VPMN, configure the network elements for the VPMN, and provide registration information to the MVNO, thereby enabling subscribing customers of the MVNO to communicatively couple to the newly provisioned VPMN via mobile devices.

A VPMN provides private network communications on shared network elements. In some instances, a VPMN may extend end-to-end on a mobile wireless network. In other instances, a VPMN may only be included within some network elements and/or some types of network elements. To partition (e.g., virtualize) many network elements, portions of a control plane and/or a data plane of the network elements are partitioned for a particular VPMN. Partitioning network elements may also include partitioning processing power and/or bandwidth of the network elements for a particular VPMN to separate the VPMN from other portions of a wireless mobile network. By virtualizing VPMNs in a mobile wireless network, the VPMNs provide a private secure virtual circuit (and/or a private path using similar technology such as, for example, a Multiprotocol Label Switching (MPLS) path) extending from each subscribing customer to an external packet switched network, other subscribing customers, and/or data centers of a MVNO. In some examples, a VPMN may use virtual circuits of a Virtual Private Local Area Network (LAN) Service (VPLS) to tunnel through an external packet switched network to one or more virtual machines in a cloud computing environment.

To manage the creation of a VPMN for a client (e.g., a MVNO), the example methods, apparatus, and articles of manufacture described herein utilize an example control architecture that dynamically coordinates an allocation of network elements based on client and/or customer utilization of the VPMN. The example control architecture can change how much of each network element is allocated to a MVNO based on current, future, and/or predicted wireless mobile network traffic and/or bandwidth usage. In this manner, a MVNO can license a portion of a wireless mobile network while a network provider uses the example control architecture to dynamically determine how much of the network is to be allocated to the MVNO based on network conditions.

Additionally, the example methods, apparatus, and articles of manufacture described herein create and/or manage a VPMN on a portion of network elements and/or substantially all network elements to provide end-to-end service. In some instances, a MVNO may elect to share a wireless spectrum. In these examples, the VPMN may extend to an eNodeB (e.g., a BTS) that provides a wireless spectrum to customers. In other examples, a MVNO may elect to have a separate wireless spectrum. In these other examples, the MVNO and/or the network provider may provide a dedicated eNodeB to the MVNO that is communicatively coupled to the VPMN at a serving gateway. Further, a MVNO may indicate which features, and/or functions associated with serving gateways, PDN gateways, MMEs, and/or HSSs are to be included within a VPMN.

Additionally or alternatively, the example methods, apparatus, and articles of manufacture described herein enable MVNOs to deploy mobile devices to customers that are configured to communicatively couple to a specific VPMN of the MVNO. In other examples, the MVNO may deploy mobile devices to customers that are configured to connect to the VPMN of the MVNO and another VPMN and/or wireless mobile network. In these other examples, a customer can select to which wireless network the mobile device is to communicatively couple. For example, to place a business call a customer may select a corporate VPMN managed by a MNVO and to place a personal call the customer may select a public wireless mobile network operated by a wireless mobile network provider.

Through the use of separate isolated VPMNs, the example methods, apparatus, and articles of manufacture described herein provide enhanced security. Thus, a compromise on a first VPMN cannot propagate to other VPMNs because the VPMNs are logically separate. As a result of enhanced security, some MVNOs with relatively more stringent security requirements can utilize VPMNs without implementing other security protocols and/or methods.

Further, because the example methods, apparatus, and articles of manufacture provide isolated control of VPMNs, a wireless mobile network provider can enable MVNOs to control their leased VPMNs. In this manner, a MVNO can deploy value added mobile services to customers via a VPMN that the MVNO directly controls, manages, and/or manipulates. Because the network elements are virtualized, a wireless mobile network provider can relatively efficiently and easily migrate VPMNs away from a network element that needs maintenance without causing a disruption in service. Additionally, a wireless mobile network provider can utilize the example methods, apparatus, and articles of manufacture described herein to create VPMNs to deploy and/or validate network-wide experimental protocols and/or services prior to providing the protocol and/or service to customers.

In the interest of brevity and clarity, throughout the following disclosure, reference will be made to an example communication system 100 of FIG. 1 associated with the LTE standard. However, the methods, articles of manufacture, and apparatus described herein to configure virtual private mobile networks are applicable to other types of networks constructed using other network technologies, topologies and/or protocols.

FIG. 1 illustrates the example communication system 100 that includes an Internet Protocol (IP) network 102 (e.g., an external packet switched network, the Internet, X.25, a WiMax network, etc.) and a wireless mobile network 104. The IP network 102 includes any number and/or types of routers, switches, servers, etc. to enable communications (e.g., packet-based data). The IP network 102 may utilize and/or conform to any routing and/or communication protocols. The example wireless mobile network 104 may include any network for routing and/or managing communications between the IP network 102 and mobile devices (e.g., the mobile device 106).

In this example, the wireless mobile network 104 is shown as including and/or associated with network elements 108-112. The example network elements 108-112 are shown as one example of communicatively coupling the mobile device 106 to the IP network 102. In other examples, the wireless mobile network 104 can include additional network elements and/or different types of network elements, including, for example, an MME, an HSS, and/or a policy charging and rules function (PCRF) server. Further, the network elements 108-112 of the illustrated example correspond to the LTE standard. In other examples, the network elements 108-112 may be associated with any other wireless communication protocol and/or standard including, for example, Universal Mobile Telecommunication System (UMTS) and/or GPRS.

The example mobile device 106 (e.g., user equipment (UE)) of the illustrated example includes any device capable of wireless communicatively coupling to the wireless mobile network 104. For example, the mobile device 106 includes any laptop, smartphone, computing pad, personal digital assistant, tablet personal computer, personal communicator, etc. Additionally, while FIG. 1 shows the mobile device 106, in other examples, the communication system 100 may include additional mobile devices.

To wirelessly connect to the wireless mobile network 104, the wireless mobile network 104 includes the eNodeB 108. The eNodeB 108 is a BTS (e.g., an access point) and includes any controllers, transmitters, receivers, and/or signal generators to provide a wireless spectrum to facilitate wireless communication with, for example, the mobile device 106. The eNodeB 108 transforms communications received from the serving gateway 110 into a wireless signal transmitted to the mobile device 106. Similarly, the eNodeB 108 transforms wireless communications received from the mobile device 106 into a wired communications that may be routed to the IP network 102.

To route communications to and/or from the eNodeB 108, the wireless mobile network 104 of FIG. 1 includes the serving gateway 110. The example serving gateway 110 routes and/or forwards communications (e.g., data packets) between the PDN gateway 112 and mobile devices that are within a geographical area assigned to the serving gateway 110. Location registers within the example serving gateway 110 store location information including, for example, a geographic location of the eNodeB 108, visitor location register (VLR) information, and/or user profile information of the mobile device 106. The example serving gateway 110 may also provide authentication and/or charging functions to enable the mobile device 106 to access the wireless mobile network 104.

The example serving gateway 110 also functions as a mobility anchor for a user plane during inter-eNodeB handovers of the mobile device 106. In other words, the serving gateway 110 ensures the mobile device 106 is connected to an eNodeB when the mobile device 106 moves to a different physical location. The example serving gateway 110 further manages and stores contexts (e.g. parameters of the IP wireless mobile network and/or network internal routing information) associated with the mobile device 106. While the wireless mobile network 104 of FIG. 1 shows the single serving gateway 110, the wireless mobile network 104 may include additional serving gateways.

To interface with the IP network 102 of the illustrated example, the example wireless mobile network 104 is associated with a PDN gateway 112. In this example, the PDN gateway 112 is communicatively coupled to the IP network 102 via an interface 114. The example PDN gateway 112 functions as a router by routing communications from the wireless mobile network 104 to an appropriate edge and/or network router within the IP network 102. Also, the PDN gateway 112 routes communications directed to the mobile device 106 from the IP network 102 to an appropriate serving gateway (e.g., the gateway 110). In some examples, the PDN gateway 112 may check if the mobile device 106 is active (e.g., available to receive the communications) by sending a query to the serving gateway 110. If the serving gateway 110 indicates the mobile device is active 106, the serving gateway 110 sends a response to the PDN gateway 112 causing the PDN gateway 112 to forward the communications to the serving gateway 110. If the mobile device 106 is inactive and/or unavailable, the PDN gateway 112 may discard the communications and/or query other serving gateways in the wireless mobile network 104.

In some examples, the PDN gateway 112 transforms and/or converts communications originating from the mobile device 106 received via the serving gateway 110 into an appropriate packet data protocol (PDP) format (e.g., IP, X.25, etc.) for propagation through the IP network 102. Additionally, for communications received from the IP network 102, the PDN gateway 112 converts the communications into a wireless protocol (e.g., 3GPP LTE, Global System for Mobile Communications (GSM), etc.) and readdresses the communications to the corresponding serving gateway 110.

To configure VPMNs on the network elements 108-112, the wireless mobile network 104 includes a VPMN controller 116. The example VPMN controller 116 receives requests from clients (e.g., MVNOs) for VPMNs, identifies the available network elements 108-112 for the requested VPMNs, and partitions control and/or data plane space on the network elements 108-112 to configure the VPMNs. In some examples, the VPMN controller 116 may also configure the mobile device 106 to access a VPMN.

To receive requests for a VPMN, the example communication system 100 of FIG. 1 includes a Mobility-as-a-Service (Maas) portal 120. The MaaS portal 120 enables clients to specify requirements for a VPMN. In some examples, the MaaS portal 120 may be an interface of the VPMN controller 116 that a client accesses via the IP network 102. In other examples, the client may directly access the VPMN controller 116.

In the illustrated example, a client administrator 122 (e.g., a client) accesses the MaaS portal 120 to request a VPMN. The request for a VPMN may include a list of mobile devices that are to be authorized to access the VPMN, an estimated maximum and/or average amount of bandwidth to be utilized, a geographic location for the VPMN (including a geographic location of the eNodeB 108 and/or the serving gateway 110), administrative information, billing information, and/or any other information that may be needed to provision a VPMN.

In response to the client administrator 122 requesting a VPMN, the MaaS portal 120, via the VPMN controller 116, establishes a VPMN through the network elements 108-112. Examples of VPMNs are described below in conjunction with FIGS. 2-4. To enable mobile devices associated with the client administrator 122 to access the newly created VPMN, the VPMN controller 116 assigns the VPMN an access point name (APN). The APN enables communications from mobile devices associated with the client administrator 122 to be routed through the wireless mobile network 104 to the VPMN.

An APN identifies a PDN that a mobile device requests to communicatively couple. The APN may also define a type of service, server, and/or multimedia message service that is provided by a PDN. Typically, an APN includes a network identifier and an operator identifier. The network identifier may define an external network to which the PDN gateway 112 is connected (e.g., the IP network 102). The operator identifier specifies which network (e.g., VPMN) is associated with the PDN gateway 112. In the example of FIG. 1, the VPMN controller 116 uses operator identifiers of APNs to identify to which VPMN communications from a mobile device are to be routed.

The example VPMN controller 116 of the illustrated example transmits an assigned APN to the client administrator 122, which then provides the APN to subscribing customers. The VPMN controller 116 also registers the APN with APN domain name system (DNS) servers 124 and 126 within the respective networks 102 and 104. Registering the APN with the APN DNS servers 124 and 126 enables communications associated with a VPMN to be routed to the appropriate VPMN on the network elements 108-112 when the client administrator 122 requests and/or when the VPMN controller 116 is unable to extend the VPMN from end-to-end (e.g., from the eNodeB 108 to the interface 114 of the PDN gateway 112). Thus, the use of APNs enables the VPMN controller 116 to provision a VPMN over a portion of the network elements 108-112 when other network elements are not capable and/or are not configured to host the VPMN.

In an example, the mobile device 106 subscribes to a wireless mobile network service provided by the client administrator 122 (e.g., a MVNO). By subscribing, the client administrator 122 provides the mobile device 106 with an APN. To communicatively couple to the wireless mobile network 104, the mobile device 106 transmits the APN, which identifies the VPMN of the client administrator 122. In examples where the eNodeB 108 includes the VPMN, the eNodeB 108 routes communications from the mobile device 106 to the VPMN for transmission to the IP network 102. However, if the eNodeB 108 does not include the VPMN, the eNodeB 108 forwards the communications, including the APN to the serving gateway 110. The serving gateway 110 transmits a request to the APN DNS servers 126 and/or 124 to resolve the APN to an IP address assigned to a particular PDN gateway 112. The serving gateway 110 uses the response from the servers 124 and/or 126 to route the communications to the appropriate PDN gateway 112 that includes the target VPMN. In some examples where the network provider mobility APN DNS server 126 does not have a list to resolve the APN, the server 126 may have to query the MaaS APN DNS server 124 in the IP network 102 to resolve the APN to a VPMN and/or an address of the PDN gateway 112 (e.g., the PDN gateway 112).

Figure 2:
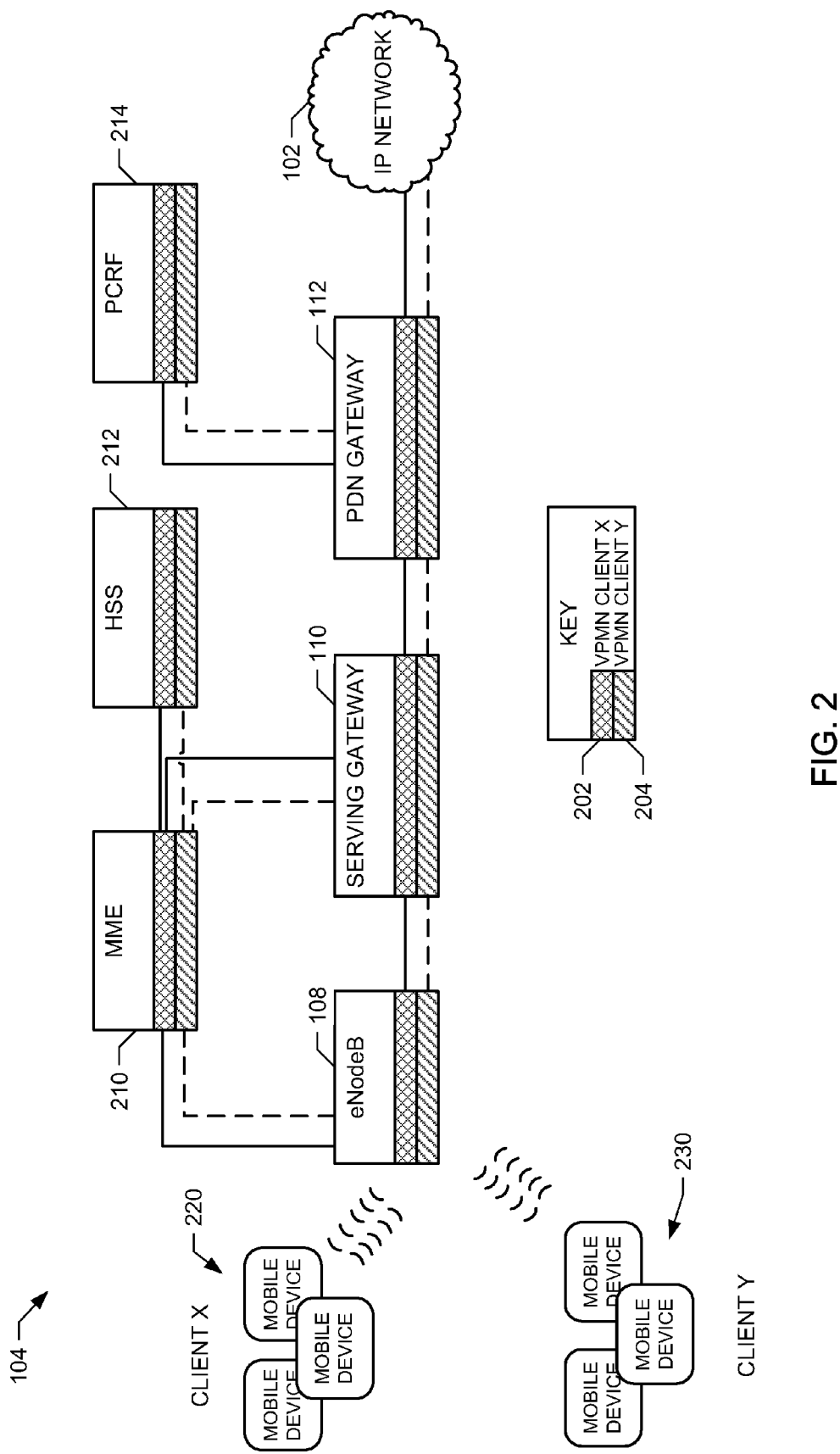
Figure 3:
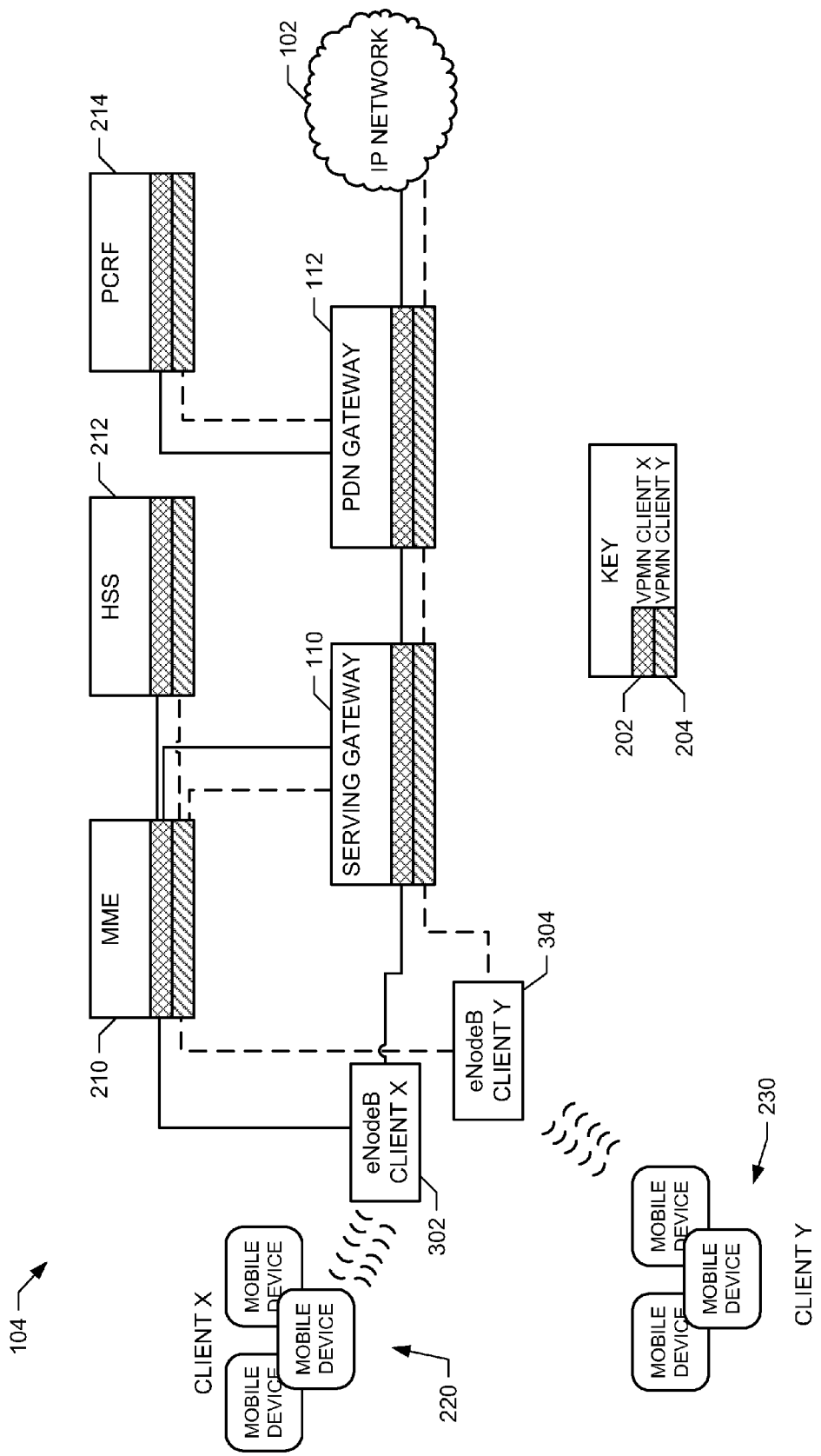

FIGS. 2-4 show the example wireless mobile network 104 of FIG. 1 with VPMNs 202 and 204. In these illustrated examples, the VPMN 202 is associated with and/or configured for the Client X and the VPMN 204 is associated with and/or configured for the Client Y. In other examples, the wireless mobile network 104 may include additional VPMNs or fewer VPMNs.

In the example of FIG. 2, the wireless mobile network 104 includes the network elements 108-112 of FIG. 1. Additionally, the wireless mobile network 104 includes an MME 210, an HSS 212, and a PCRF server 214. In other examples, the wireless mobile network 104 may include additional network elements and/or additional types of network elements.

The example MME 210 tracks and pages mobile devices that are communicatively coupled to the wireless mobile network 104. The example MME 210 may also activate and/or deactivate mobile devices and/or authenticate mobile devices attempting to connect to the wireless mobile network 104 by requesting user profile information from the HSS 212. In some examples, the MME 210 may be similar to the servers 124 and 126 of FIG. 1 by selecting the appropriate serving gateway 110 and/or PDN gateway 112 when mobile devices provide an APN to connect to one of the VPMNs 202 and 204.

The example HSS 212 of FIG. 2 includes a database of subscription-related information (e.g., subscribing customer profiles). The example HSS 212 performs authentication and/or authorization of a mobile device attempting to access the wireless mobile network 104 by providing the MME 210 with mobile device profile information to match to profile information by the requesting mobile device. The HSS 212 may also include information about a geographic location of a subscribing customer and/or IP information associated with a mobile device of the customer.

The example PCRF server 214 determines policy rules for the wireless mobile network 104. The example PCRF server 214 aggregates information to and/or from the wireless mobile network 104 and/or the network elements 108-112, 210, and 212 in real time to create rules. Based on the created rules, the PCRF server 214 automatically makes intelligent policy decisions for each mobile device active on the wireless mobile network 104. In this manner, the PCRF server 214 enables a wireless mobile network provider to offer multiple services, quality of service (QoS) levels, and/or charging rules.

In the example of FIG. 2, the Client X requests the VPMN 202 from the VPMN controller 116 of FIG. 1 to enable mobile devices 220 that subscribe to a service offered by the Client X to connect to the IP network 102. Similarly, the Client Y requests the VPMN 204 to enable mobile devices 230 that subscribe to a service offered by the Client Y to connect to the IP network 102. In this example, the Client X and the Client Y may be MVNOs.

In this illustrated example, the Clients X and Y request that the VPMNs 202 and 204 extend end-to-end of the wireless mobile network 104. As a result of the request, the VPMN controller 116 extends the VPMNs 202 and 204 to all of the network elements 108-112 and 210-214 within the wireless mobile network 104. In other examples, the Clients X and Y may only request and/or may only be able to request a VPMN to be setup on some of the network elements 108-112 and 210-214. By requesting the VPMNs 202 and 204, the example VPMN controller 116 identifies available space within the network elements 108-112 and 210-214 and allocates control and/or data planes of the network elements 108-112 and 210-214 for each of the VPMNs 202 and 204. The VPMN controller 116 then configures the allocated control and/or data plane portions of the network elements 108-112 and 210-214 for the respective VPMNs 202 and 204.

To configure the network elements 108-112 and 210-214, the example VPMN controller 116 may assign an APN to each of the VPMNs 202 and 204 and update a control plane of the network elements 108 and 210-214 with the APN assignment. The VPMN controller 116 may also assign and/or configure specific interfaces, switches, and/or processors within the network elements 108-112 and 210-214 to host the respective VPMNs 202 and 204.

The mobile devices 220 and 230 use the assigned APN to access the respective VPMNs 202 and 204. Further, by using the APN, the network elements 108-112 and 210-214 may propagate communications within the appropriate VPMNs 202 and 204 until an end point is reached. By using APNs, the example VPMN controller 116 creates exclusive virtual circuits (e.g., MPLS paths) from the eNodeB 108 to the PDN gateway 112 for routing communications within the appropriate VPMNs 202 and 204. Thus, the APNs ensure that communications from the mobile devices 220 are routed through the wireless mobile network 104 via the VPMN 202 and communications from the mobile devices 230 are routed through the wireless mobile network 104 via the VPMN 204.

Further, the VPMNs 202 and 204 partitioned within the network elements 210-214 enable access control, authentication, mobile device profile management, and/or network rules to be configurable for each of the Clients X and Y. Thus, subscriber information for the Client X within the HSS 212 is separate from subscriber information for the Client Y. The separation of the control and/or data planes of the network elements 210-214 via the VPMNs 202 and 204 also enables the Clients X and Y to provide different types of services using the same network elements 108-112 and 210-214. Further, the separation of the control and/or data planes of the network elements 210-214 via the VPMNs 202 and 204 prevents security issues in, for example, the VPMN 202 from propagating to the VPMN 204.

Additionally, because the VPMNs 202 and 204 of FIG. 2 are virtualized within the network elements 108-112 and 210-214, the VPMN controller 116 may adjust an amount of bandwidth and/or processing capability allocated by each of the VPMNs 202 and 204 based on current, future, and/or predicted network traffic. For example, during some times of a day, the VPMN controller 116 may allocate relatively more of a wireless spectrum of the eNodeB 108 for the Client X and additional bandwidth between the gateways 110 and 112 for the VPMN 202. Then, during other times of the day, the VPMN controller 116 may detect that there are relatively more of the mobile devices 230 associated with the Client Y accessing the wireless mobile network 104 and reallocate the wireless spectrum of the eNodeB 108 and the bandwidth between the gateways 110 and 112 to accommodate the increased traffic.

FIG. 3 shows the example wireless mobile network 104 with the eNodeB 108 of FIGS. 1 and 2 replaced by an eNodeB 302 for the Client X and an eNodeB 304 for the Client Y. In this example, the Clients X and Y may request separate wireless spectrums. To accommodate the requests of Clients X and Y, the wireless mobile network provider (e.g., the VPMN controller 116) may provision the separate eNodeBs 302 and 304 to provide separate wireless spectrums. In other examples, the Clients X and Y may own their own wireless spectrum and/or the respective eNodeBs 302 and 304.

In the illustrated example, because the eNodeBs 302 and 304 are separate, the VPMN controller 116 does not have to determine a control and/or data plane allocation for the eNodeBs 302 and 304. Thus, communications received by the eNodeB 302 from the subscribed mobile devices 220 are routed to the VPMN 202 within the serving gateway 110 and communications received by the eNodeB 304 from the subscribed mobile devices 230 are routed to the VPMN 204 within the serving gateway 110. In these examples, the eNodeBs 302 and 304 access respective portions of the VPMN 202 and 204 within the MME 210 and/or the HSS 212 to authorize and/or authenticate the respective mobile devices 220 and 230. The example eNodeBs 302 and 304 may also access respective portions of the VPMN 202 and 204 within the MME 210 to determine to which serving gateway and/or PDN gateway within the wireless mobile network 104 the communications are to be routed.

In contrast to the illustrated example of FIG. 3, the wireless mobile network 104 in FIG. 2 shows the Clients X and Y leasing wireless spectrum from the wireless mobile network provider. As a result of the shared wireless spectrum in FIG. 2, the VPMN controller 116 allocates and/or configures portions of the eNodeB 108 for each of the VPMNs 202 and 204. Thus, in FIG. 2, a controller within the eNodeB 108 uses APNs to determine to which of the VPMNs 202 and 204 communications from the mobile devices 220 and 230 are to be routed.

FIG. 4 shows the example wireless mobile network 104 with a mobile device 402 configured for the VPMN 202 and the VPMN 204. In this example, the mobile device 402 includes functionality that enables a user of the mobile device 402 to select to which of the VPMNs 202 and 204 to connect. In this example, a first portion 404 of the mobile device 402 is associated with and/or configured for the VPMN 202 and a second portion 406 of the mobile device is associated with and/or configured for the VPMN 204.

In some examples, the Client X and/or Y may install software, firmware, and/or hardware on the mobile device 402 to enable connectivity to the VPMNs 202 and 204. For example, the first portion 404 may include a virtualized kernel that encodes data and/or communications from applications and/or functions of the mobile device. The encoding of the data and/or communications may conform to the VPMN 202. Similarly, the second portion 406 may include a virtualized kernel that encodes data and/or communications configured for the VPMN 204. The partitioning of the mobile device 402 enables the Clients X and Y to install dedicated functionality that conforms to services provided by the respective VPMNs 202 and 204. The Clients X and/or Y may also provide an APN for each of the VPMNs 202 and 204.

To connect to the VPMN 202, the mobile device 202 uses the first portion 404 to send an APN associated with the VPMN 202 to the eNodeB 302. Because the APN is only associated with the VPMN 202, the mobile device 402 cannot communicatively couple the first portion 404 to the eNodeB 304 (e.g., the user profile of the mobile device 402 stored within the VPMN 204 portion of the HSS 212 cannot authenticate the mobile device 402 using the APN associated with the VPMN 202). Thus, the end-to-end security and separation of the VPMNs 202 and 204 begin at the mobile device 402.

In some examples, the mobile device 402 may concurrently access the VPMNs 202 and 204 using the respective portions 404 and 406 of the mobile device 402. For example, a customer may send data to a corporate network via the VPMN 202 using the first portion 404 of the mobile device 402 while transmitting voice communications with a spouse via the VPMN 204 using the second portion 406 of the mobile device 402. In other examples, the mobile device 402 may only enable a customer to use either the first portion 404 or the second portion 406.

FIG. 5 shows a functional diagram of the example VPMN controller 116 of FIG. 1. The example VPMN controller 116 may be included within a controller, server, processor, and/or computing center of a wireless mobile network provider. In some examples, the VPMN controller 116 may be included within a data plane and/or control plane allocation controller of a wireless mobile network provider.

To receive requests from clients (e.g., the client administrator 122 of FIG. 1) for VPMNs, the example VPMN controller 116 of the illustrated example includes a client interface 502 (e.g., the MaaS portal 120). The example client interface 502 provides a framework that enables clients to request a VPMN by selecting, for example, bandwidth requirements, geographic location, wireless spectrum frequencies, and/or which types of network elements are to host a VPMN. The request may also include client administrative information including billing information, profile information, network addresses, etc. In some examples, the client interface 502 may be a web-based interface that provides options and/or templates that clients can select to request a VPMN. In other examples, the client interface 502 may include a phone-request system and/or a form request system.

After receiving a request from a client for a VPMN, the client interface 502 creates a client account that includes the information provided by the client. The client interface 502 stores the client account to a client records database 504. In some examples, the HSS 212 of FIGS. 2-4 may access the client records database 504 for client profile information for security authentication and/or authorization. The client records database 504 may be implemented by Electronically Erasable Programmable Read-Only Memory (EEPROM), Random Access Memory (RAM), Read-Only Memory (ROM), and/or any other type of memory.

The example client interface 502 may also assign one or more APNs to a VPMN requested by a client. The client interface 502 may store the APN(s) to the client account in the client records database 504. Additionally, the client interface 502 may transmit the APN(s) and/or any information associated with a newly created VPMN to the client.

To manage the creation and/or management of VPMNs, the VPMN controller 116 of FIG. 5 includes a network manager 506. The example network manager 506 uses the information provided by the client to create a VPMN. To determine which network elements will host the VPMN, the network manager 506 receives a status of the wireless mobile network 104 via a network monitor 508.

The example network monitor 508 of the illustrated example scans the wireless mobile network 104 to determine network traffic conditions, bandwidth usage, and/or any QoS issues. In some examples, the network monitor 508 may maintain a history of network performance based on detected network conditions. The network monitor 508 may also determine an amount of available capacity and/or bandwidth within network elements (e.g., the network elements 108-112, 210-214, 302, and 304 of FIGS. 1-4).

The example network manager 506 of FIG. 5 uses the information from the network monitor 508 to identify available network elements to host a VPMN. The network manager 506 may also use information associated with other client VPMNs stored in the client records database 504 to determine if there is available capacity within the identified network elements based on already licensed VPMN usage. If there is no additional capacity for another VPMN, the network manager 506 identifies other available network elements.

For each of the network elements with available capacity, the network manager 506 allocates a portion of a control plane and/or a data plane. Allocating a data plane may include allocating a portion of a wireless spectrum of one or more eNodeBs for a VPMN. The network manager may also allocate a data plane by partitioning a portion of a switch within for example, the gateways 110 and 112 for network traffic associated with a VPMN. The network manager 506 may further allocate a data plane by designating certain interfaces of a switch and/or a router for a VPMN. After allocating data plane space to network elements, the network manager 506 sends an instruction to a data plane configurer 510 to configure a data plane on the allocated portions of the identified network elements.

The example network manager 506 allocates a control plane by, for example, designating a portion of IP address space that is to be associated with a VPMN. The portion of the IP address space may be referenced to an assigned APN for a client. The example network manager 506 may also partition a control plane of a network element by virtualizing functionality of the network element specifically designated for a VPMN. The example network manager 506 may further allocate a control plane by partitioning portions of databases and/or servers (e.g., the MME 210, HSS 212, and/or the PCRF 214) to store information associated with clients and/or subscribing customers of a VPMN. After allocating control plane space to network elements, the network manager 506 sends an instruction to a control plane configurer 512 to configure a control plane on the allocated portions of the identified network elements.

By allocating portions of a data plane and/or a control plane, the example network manager 506 may also specify a virtual circuit (and/or other type of private path such as, for example, a MPLS path) to be implemented within a VPMN. To specify a virtual circuit, the network manager 506 identifies outgoing and/or incoming interfaces of the network elements associated with the VPMN and/or IP address space allocated to the VPMN. The example network manager 506 then links together the interfaces, routers, switches, interfaces, and/or connections based on the identified information to create the virtual circuit and updates routing and/or forwarding tables within the corresponding network elements. Thus, any communications associated with a VPMN are transmitted between the VPMN allocated portions of the network elements.

Additionally, the network manager 506 may determine if a client is providing an eNodeB to a VPMN (e.g., in examples where a client wants a separate wireless spectrum as described in conjunction with FIG. 3). If the client is providing an eNodeB, the client interface 502 receives parameters associated with the eNodeB from the client. The network manager 506 uses the parameters and/or an assigned APN to associate the VPMN to the eNodeB of the client. A mobile device configurer 514 and/or an APN manager 516 may then configure the eNodeB to be communicatively coupled to one or more serving gateways that have partitioned space for the VPMN.

To configure a VPMN on a data plane of network elements, the example VPMN controller 116 of FIG. 5 includes the data plane configurer 510. The example data plane configurer 510 provisions a VPMN on portions of network elements identified by the network manager 506. The example data plane configurer 510 may configure and/or provision a VPMN by designating, for example, frequencies of a wireless spectrum provided by an eNodeB for a VPMN.

Additionally, the data plane configurer 510 may designate portions of a server and/or a router (e.g., the gateways 110 and/or 112) for hosting the VPMN. The example data plane configurer 510 may also create a virtual circuit (e.g., MPLS path) for a VPMN by updating routing and/or forwarding tables of network elements based on information from the network manager 506. The example data plane configurer 510 may also dynamically change an amount of bandwidth and/or processing capacity provisioned for a VPMN based on instructions from the network manager 506.

For example, the network manager 106 may receive an indication from the network monitor 508 that a VPMN on a serving gateway is operating close to provisioned capacity. In this example, the network manager 106 may increase data plane space for the VPMN by instructing the data plane configurer 510 to provision additional interfaces, links, circuitry, and/or processing capacity of the serving gateway for the VPMN. Thus, the data plane configurer 510 enables a VPMN to be dynamically provisioned based on current, future, and/or predicted network traffic conditions.

To configure a VPMN on a control plane of network elements, the example VPMN controller 116 of FIG. 5 includes the control plane configurer 512. The example control plane configurer 510 provisions a VPMN on portions of network elements identified by the network manager 506. The example control plane configurer 510 may configure a VPMN in a control plane of a network element by updating routing and/or forwarding tables with an IP address space and/or an APN assigned to a client for communications associated with a VPMN.

Further, the control plane configurer 512 may provision portions of a database storing client profile information and/or subscriber profile information so that the information is only accessible via a VPMN. In other examples, the control plane configurer 512 may update network elements with specialized service information for a VPMN. Thus, the control plane configurer 512 ensures that client and/or subscribing customer information associated with different VPMNs can be stored on the same network element so that the information is only accessible to entities and/or network elements associated with the corresponding VPMN.

To update mobile devices with information, thereby enabling the mobile devices to communicatively couple to a VPMN, the example VPMN controller 116 of FIG. 5 includes a mobile device configurer 514. The example mobile device configurer 514 may install functionality to a mobile device (e.g., the mobile device 402) to enable the mobile device to connect to a VPMN. For example, the mobile device configurer 514 may transmit an APN associated with a VPMN to corresponding mobile devices. The example mobile device configurer 514 may also transmit mobile device information and/or customer profile information to network elements to enable the network elements to authorize and/or authenticate a mobile device connecting to a VPMN. In other examples, a client (e.g., a MVNO) may pre-configure a mobile device with functionality to connect to a VPMN prior to providing the mobile device to a subscribing customer.

To propagate an APN assigned to a VPMN to network elements, the example VPMN controller 116 of the illustrated example includes an APN manager 516. The example APN manager 516 receives an APN assigned to a VPMN by the network manager 506 and transmits the APN to network elements that have a portion of a control and/or a data plane partitioned for an associated VPMN. For example, the APN manager 516 may transmit an APN to the HSS 212 and/or the MME 210, thereby enabling the MME 210 to determine to which VPMN on the serving gateway 110 communications from a mobile device are to be routed. Additionally or alternatively, the APN manager 516 may transmit an assigned APN to the APN DNS servers 124 and 126 of FIG. 1. In examples where more than one APN is associated with a client, the APN manager 516 transmits the appropriate APN to network elements. Further, the APN manager 516 may update APNs stored on the network elements as the APNs are updated by the VPMN controller 116.

While the example VPMN controller 116 has been illustrated in FIG. 5, one or more of the servers, platforms, interfaces, data structures, elements, processes and/or devices illustrated in FIG. 5 may be combined, divided, re-arranged, omitted, eliminated and/or implemented in any way. Further, the example client interface 502, the example client resource database 504, the example network manager 506, the example network monitor 508, the example data plane configurer 510, the example control plane configurer 512, the example mobile device configurer 514, the example APN manager 516 and/or more generally, the example VPMN controller 116 may be implemented by hardware, software, firmware and/or any combination of hardware, software and/or firmware. Thus, for example, any of the example client interface 502, the example client resource database 504, the example network manager 506, the example network monitor 508, the example data plane configurer 510, the example control plane configurer 512, the example mobile device configurer 514, the example APN manager 516 and/or more generally, the example VPMN controller 116 could be implemented by one or more circuit(s), programmable processor(s), application specific integrated circuit(s) (ASIC(s)), programmable logic device(s) (PLD(s)) and/or field programmable logic device(s) (FPLD(s)), etc.

When any apparatus claim of this patent is read to cover a purely software and/or firmware implementation, at least one of the example client interface 502, the example client resource database 504, the example network manager 506, the example network monitor 508, the example data plane configurer 510, the example control plane configurer 512, the example mobile device configurer 514, and/or the example APN manager 516 are hereby expressly defined to include a computer readable medium such as a memory, DVD, CD, etc. storing the software and/or firmware. Further still, the example VPMN controller 116 may include one or more elements, processes and/or devices in addition to, or instead of, those illustrated in FIG. 5, and/or may include more than one of any or all of the illustrated elements, processes and devices.

Figure 6:
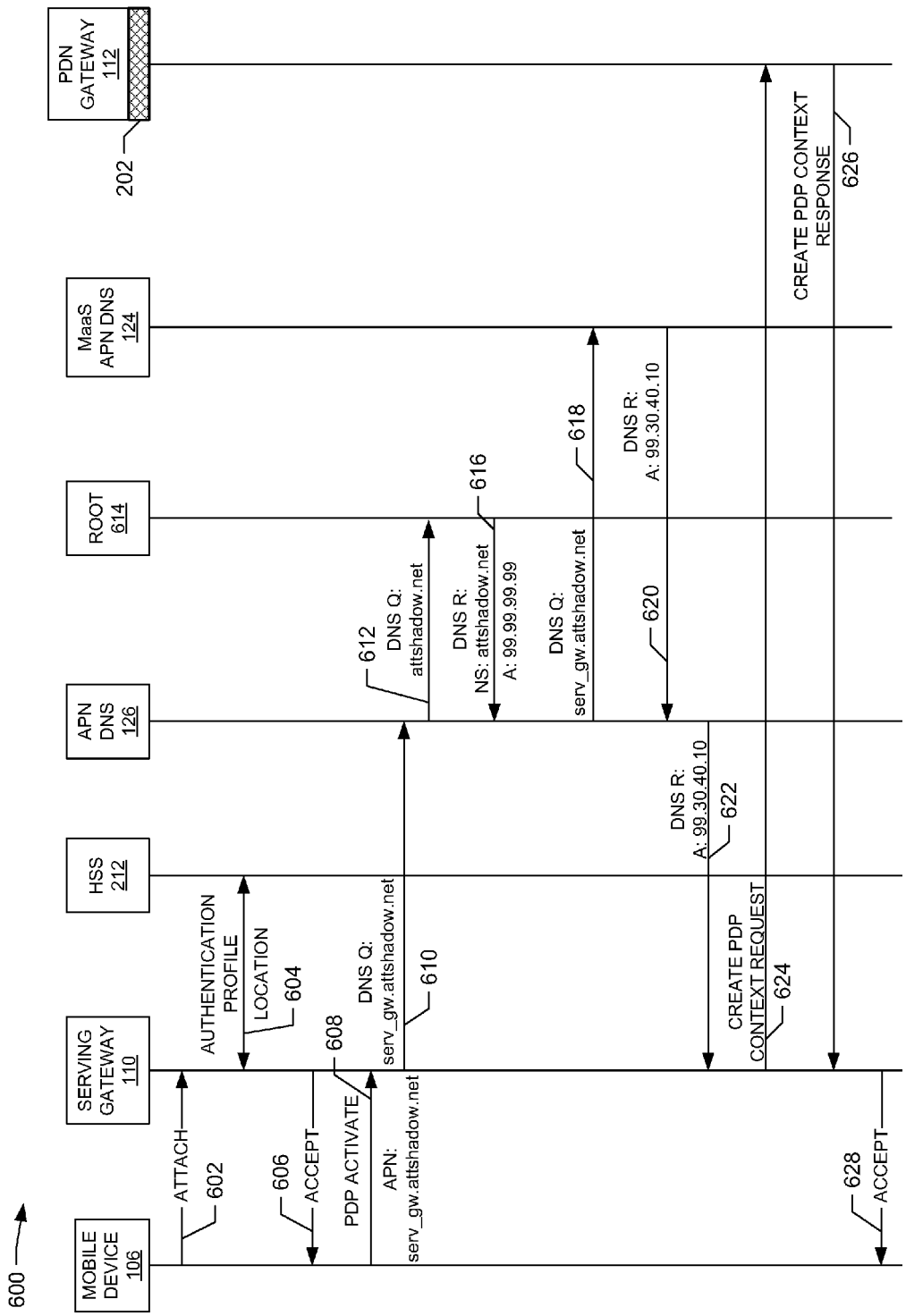
FIG. 6 illustrates an example message flow diagram that shows an example process for communicatively coupling the example mobile device of FIG. 1 to a virtual private mobile network via network elements of FIGS. 1-4.

FIG. 6 illustrates an example message flow diagram 600 that shows an example process for communicatively coupling the example mobile device 106 of FIG. 1 to the VPMN 202 of FIGS. 2-4 via the network elements 110, 112, 212, 124, and 126 of FIGS. 1-4. The example message flow diagram 600 may be used to communicatively couple the mobile device 106 to the VPMN 202 (e.g., an already created VPMN) using APN resolution when the VPMN 202 is partitioned in, for example, the PDN gateway 112. Other message flow diagrams may be used to communicatively couple a mobile device to a VPMN in other network elements. For example, a message flow diagram may not utilize the APN DNS servers 124 and/or 126 to resolve an APN when the serving gateway 110 and/or an eNodeB are partitioned for a VPMN. Further, the example message flow diagram 600 shows some example messages that may be used to connect the mobile device 106 to a VPMN. Other message flow diagrams may use different messages and/or different types of messages that conform to other wireless communication protocols.

The example message flow diagram 600 begins when the mobile device 106 transmits an attach message 602 to the serving gateway 110 via, for example, the eNodeB 108. The attach message 602 may include profile information assigned to the mobile device 106. The example serving gateway 110 receives the attach message 602 and communicates 604 with the HSS 212 to authenticate and/or validate the profile information. The HSS 212 may also specify location information of the mobile device 106. After authenticating and/or authorizing the profile information, the example serving gateway 110 of FIG. 6 transmits an accept message 606 to the mobile device 106.

In response to the accept message 606, the mobile device 106 transmits a PDP activate message 608. The example PDP activate message 608 includes an APN assigned to the mobile device 106 (e.g., serv_gw.attshadow.net). In this example, the 'serv_gw' prefix identifies a network identifier and the 'attshadow.net' suffix identifies an operator identifier (e.g., a VPMN). The serving gateway 110 receives the PDP activate message 608 and transmits a DNS query message 610 to the network provider mobility APN DNS server 126 to resolve the APN to a specific VPMN.

After receiving the DNS query message 610, the network provider mobility APN DNS server 126 parses the APN for the operator identifier and transmits a DNS query message 612 with the parsed APN to a root server 614. The example root server 614 uses the 'attshadow.net' APN suffix to determine an APN DNS server (e.g., the server 124) that includes a list and/or table to resolve the APN. The example root server 614 then transmits a DNS response message 616 with the '99.99.99.99' IP address of the identified APN DNS server 124 to the network provider mobility APN DNS server 126.

The example network provider mobility APN DNS server 126 uses the IP address to transmit a DNS query message 618 to the MaaS APN DNS server 124. The example DNS query message 618 includes the 'serv_gw.attshadow.net' APN to be resolved. The example MaaS APN DNS server 124 receives the DNS query message 618 and resolves the 'serv_gw.attshadow.net' APN to a 99.30.40.10 IP address that corresponds to the VPMN 202 in the PDN gateway 202. The MaaS APN DNS server 124 transmits a DNS response message 620 to the network provider mobility APN DNS server 126. The DNS response message 620 includes the '99.30.40.10' resolved IP address. The example network provider mobility APN DNS server 126 receives the message 620 and transmits a DNS response message 622 that includes the '99.30.40.10' resolved IP address to the serving gateway 110.

After receiving the DNS response message 622, the example serving gateway 110 of FIG. 6 generates a create PDP context request message 624 using the '99.30.40.10' resolved IP address. The serving gateway 110 then selects an interface associated with the PDN gateway 112 and transmits the PDP context request message 624. The PDP context request message 624 informs the PDN gateway 112 to route communications and/or data generated by the mobile device 106 to, for example, the IP network 102 via the VPMN 202.

The PDN gateway 112 transmits a create PDP context response message 626 to the serving gateway 110. The PDP context response message 626 may identify to which interface the serving gateway 110 is to route communications and/or data from the mobile device 106 that corresponds to the VPMN 202. The PDP context response message 626 may also inform the serving gateway 110 that the PDN gateway 112 is available to route communications and/or data to the IP network 102. The serving gateway 110 may then transmit an accept message 628 to the mobile device 106, thereby enabling the mobile device 106 to transmit data and/or communications to the IP network 102 via the VPMN 202 within the PDN gateway 112.

Figure 7A:
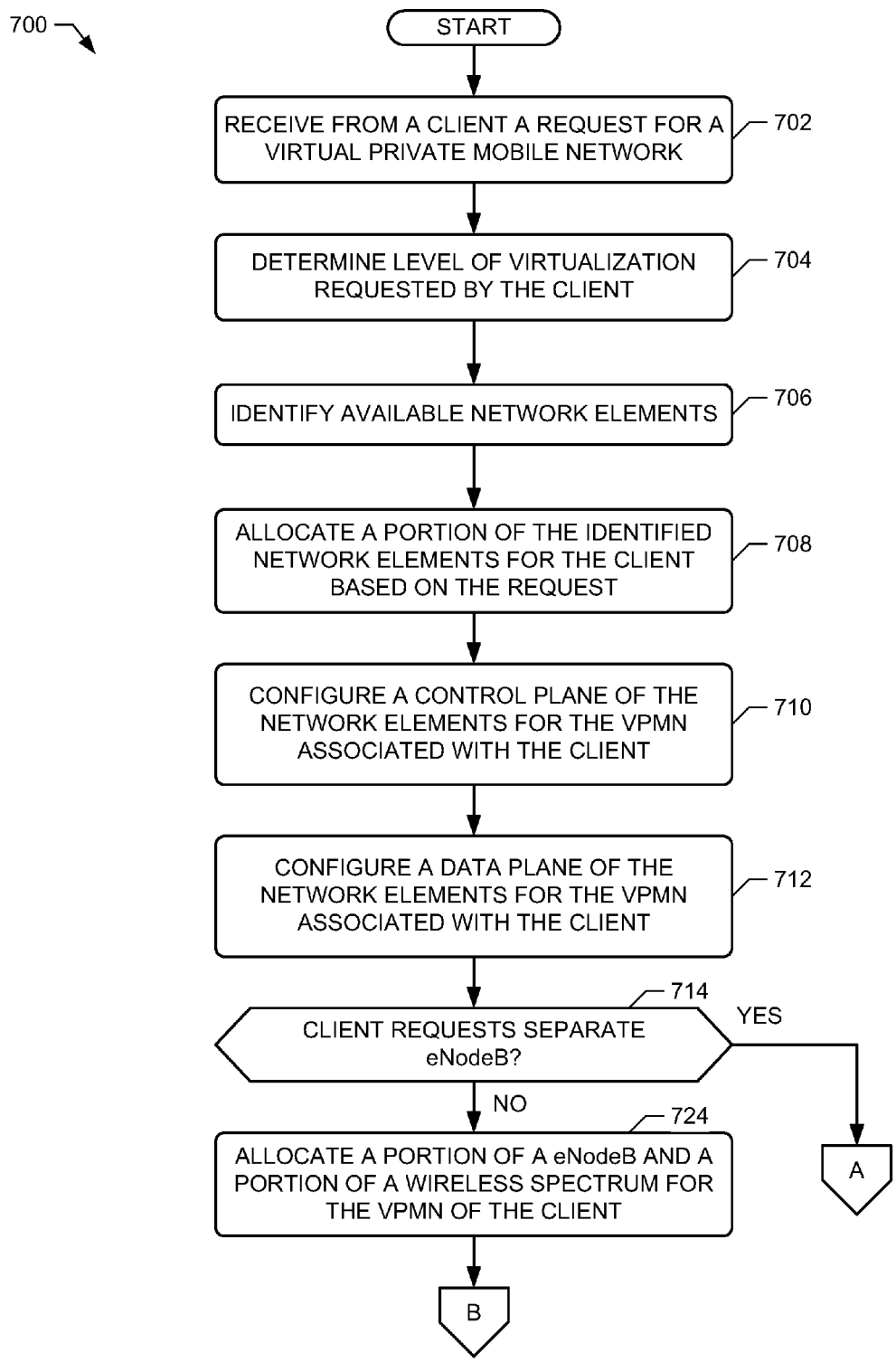
FIGS. 7A and 7B are flowcharts representative of example machine-accessible instructions, which may be executed to implement the virtual private mobile network controller of FIGS. 1 and 5.
Figure 7B:
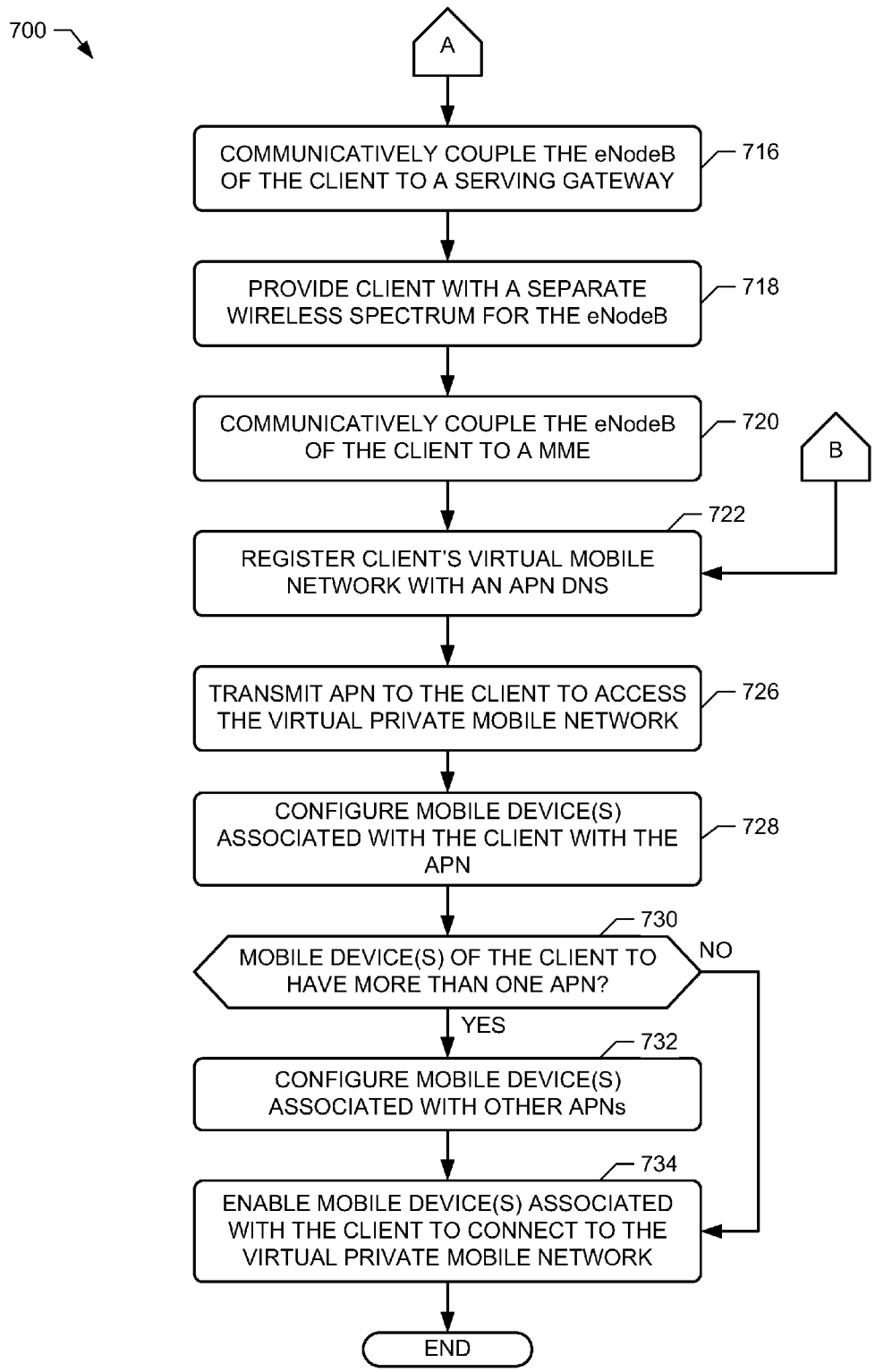

FIGS. 7A and 7B depict example flow diagrams representative of processes that may be implemented using, for example, computer readable instructions that may be used to configure virtual private mobile networks. The example processes of FIGS. 7A and 7B may be performed using a processor, a controller and/or any other suitable processing device. For example, the example processes of FIGS. 7A and 7B may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. The example processes of FIGS. 7A and 7B may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIGS. 7A and 7B may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 7A and 7B may be implemented manually or as any combination(s) of any of the foregoing techniques, for example, any combination of firmware, software, discrete logic and/or hardware. Further, although the example processes of FIGS. 7A and 7B are described with reference to the flow diagrams of FIGS. 7A and 7B, other methods of implementing the processes of FIGS. 7A and/or 7B may be employed. For example, the order of execution of the blocks may be changed, and/or some of the blocks described may be changed, eliminated, sub-divided, or combined. Additionally, any or all of the example processes of FIGS. 7A and 7B may be performed sequentially and/or in parallel by, for example, separate processing threads, processors, devices, discrete logic, circuits, etc.

The example process 700 of FIGS. 7A and 7B provisions a VPMN for a client using, for example, the VPMN controller 116 of FIGS. 1 and 5. The example process 700 begins by receiving in the client interface 502 a request from the client (e.g., the client administrator 122) for a VPMN (block 702). The request may also include client profile information and/or client administration information. The example client interface 502 then determines a level of virtualization requested by the client (block 704). The level of virtualization may include a number and/or types of network elements within a wireless mobile network that are to host the VPMN. The example network manager 506 and/or the network monitor 508 next identifies available network elements to host the VPMN based on information included within the request (block 706).

The example process 700 continues by the network manager 506 allocating a portion of a control and/or a data plane of the identified network elements for the VPMN based on the request from the client (block 708). The network manager 506 may designate the allocations based on a bandwidth requested by the client, a number of estimated customers of the client, and/or any other information provided by the client. After determining an allocation of a control plane, the control plane configurer 512 configures a control plane on the network elements to create the VPMN control plane instance for the client (block 710). Further, after determining an allocation of a data plane for the associated network elements, the data plane configurer 510 configures a data plane on the network elements to create the VPMN data plane instance for the client (block 712)

The example process 700 of FIG. 7A then determines, via the network manager 506 and/or the client interface 502, if the client requests and/or is providing an eNodeB for a separate wireless spectrum (block 714). If the client requests a separate wireless spectrum, the example process 700 of FIG. 7B then communicatively couples the eNodeB requested and/or provided by the client to a serving gateway via the client interface 502 and/or the network manager 506 (block 716). The client interface 502 and/or the network manager 506 communicatively couples the eNodeB to a serving gateway by linking the eNodeB to the serving gateway via a wired and/or wireless connection, assigning a network address to the eNodeB, updating routing and/or forwarding tables within the eNodeB with a network address of the serving gateway, and updating routing and/or forwarding tables within the serving gateway with a network address of the eNodeB. The example network manager 506 then provides the client with the separate wireless spectrum (block 718). The example VPMN controller 116 may then communicatively couple the newly added eNodeB to a MME within, for example, the wireless mobile network 104 (block 720). The example APN manager 516 next registers an assigned APN associated with the newly created VPMN with, for example the APN DNS servers 124 and/or 126 of FIG. 1 and/or the MME 210 of FIGS. 2-4 (block 722).

Additionally, if the client does not request a separate eNodeB (block 714 of FIG. 7A), the example network manager 506 allocates a portion of an eNodeB and a portion of a wireless spectrum for the VPMN of the client (block 724). The example APN manager 516 then registers an assigned APN associated with the newly created VPMN with, for example the APN DNS servers 124 and/or 126 (block 722). The example client interface 502 next transmits the assigned APN to the client (e.g., the client administrator 122) to enable mobile devices associated with the client to access the newly created VPMN (block 726).

The example process 700 of FIG. 7B continues by the mobile device configurer 514 configuring mobile devices associated with the client with information (e.g., the assigned APN) to connect the VPMN (block 728). In other examples, the client may provide the APN and/or configuration information to the mobile devices. The example mobile device configurer 514 may then determine if the mobile devices associated with the client are to have more than one APN (e.g., the mobile devices are to communicatively couple to more than one VPMN) (block 730). If at least one mobile device is to have more than one APN, the example mobile device configurer 514 configures the mobile device(s) to be able to connect to the assigned APN in conjunction with connecting to other VPMNs and/or other wireless mobile networks (block 732). The example mobile device configurer 514 then enables the mobile devices associated with the client to connect to the VPMN. The example process 700 of FIGS. 7A and 7B then terminates.

Figure 8:
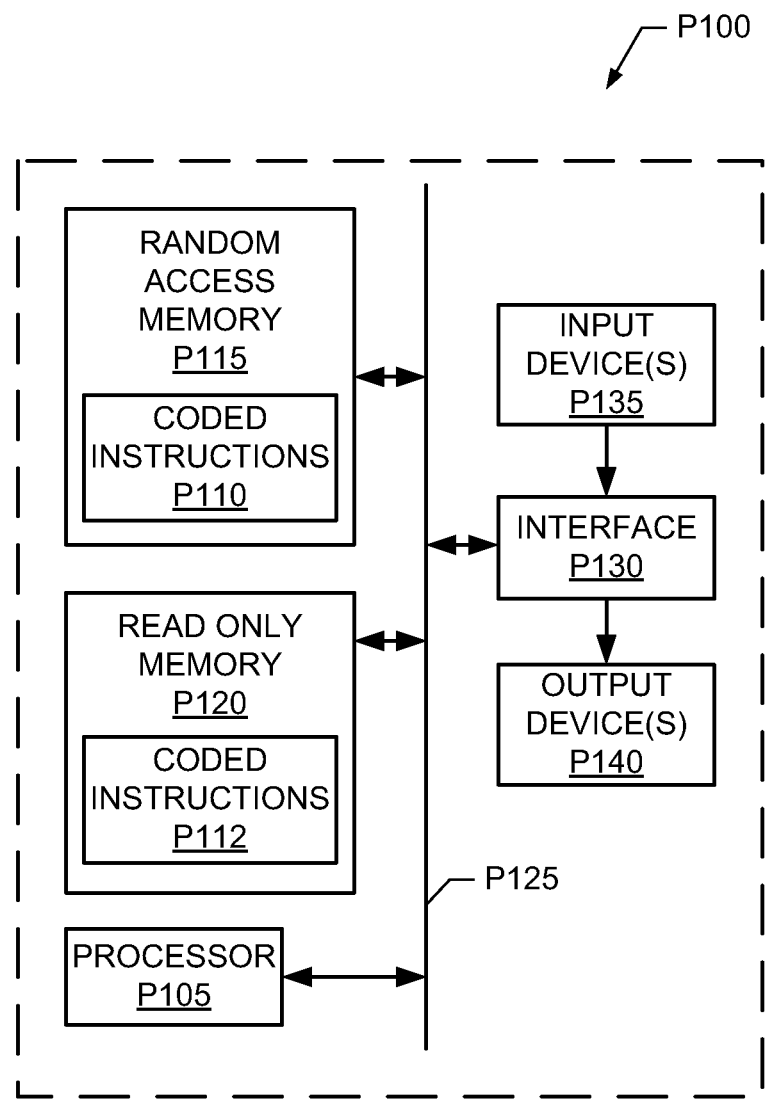
FIG. 8 is a schematic illustration of an example processor platform that may be used and/or programmed to execute the example processes and/or the example machine-accessible instructions of FIGS. 7A and/or 7B to implement any or all of the example methods, apparatus and/or articles of manufacture described herein.

FIG. 8 is a schematic diagram of an example processor platform P100 that may be used and/or programmed to implement the example client interface 502, the example client resource database 504, the example network manager 506, the example network monitor 508, the example data plane configurer 510, the example control plane configurer 512, the example mobile device configurer 514, the example APN manager 516 and/or more generally, the example VPMN controller 116 of FIGS. 1-6. For example, the processor platform P100 can be implemented by one or more general-purpose processors, processor cores, microcontrollers, etc.

The processor platform P100 of the example of FIG. 8 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 7A and/or 7B to implement the example methods and apparatus described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown). One or both of the example memories P115 and P120 may be used to implement the example resource client database 504 of FIG. 5.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to configure a virtual private mobile network, the method comprising:
   receiving a request at a wireless network provider from a client, the request instructing the wireless network provider to create the virtual private mobile network for the client;
   identifying available network elements within a wireless network of the wireless network provider based on the request from the client;
   configuring a portion of a control plane and a portion of a data plane of the identified network elements for the virtual private mobile network by creating a virtual circuit comprising a serving gateway, an Internet protocol network, a wireless base transceiver station, and a packet data network gateway for the virtual private mobile network; and
   enabling user equipment associated with the client to wirelessly communicatively couple to the virtual private mobile network by:
      determining the user equipment is authorized to access the virtual private mobile network based on a request to connect from the user equipment using an access point name;
      forwarding communications from the user equipment received at the wireless base transceiver station to the serving gateway via the virtual circuit; and
      routing the communications using the access point name from the serving gateway to the packet data network gateway to route the communications to the Internet Protocol network via the virtual circuit.

2. A method as defined in claim 1, wherein the network elements include the wireless base transceiver station and configuring the portion of the control and data planes of the wireless base transceiver station includes partitioning a portion of a wireless spectrum provided by the wireless base transceiver station for the virtual private mobile network.

3. A method as defined in claim 1, further comprising:
   determining that the client is to be allocated the wireless base transceiver station and an associated wireless spectrum based on the request; and
   communicatively coupling the wireless base transceiver station to the virtual private mobile network.

4. A method as defined in claim 3, wherein the client provides the wireless base transceiver station.

5. A method as defined in claim 1, wherein enabling the user equipment includes:
   determining the user equipment is configured for a second mobile network;
   configuring the user equipment for the virtual private mobile network by providing the user equipment an access point name associated with the virtual private mobile network; and
   enabling the user equipment to access the virtual private mobile network and the second mobile network using the access point name.

6. A method as defined in claim 5, wherein the second mobile network is a public wireless network.

7. A method as defined in claim 1, wherein the virtual private mobile network is operated by a mobile virtual network operator and the network elements are operated by the wireless network provider.

8. A method as defined in claim 1, wherein creating the virtual circuit comprises:
   extending the virtual circuit from the serving gateway to the wireless base transceiver station; and
   extending the virtual circuit from the packet data network gateway to the Internet Protocol network.

9. An apparatus to configure a virtual private mobile network, the apparatus comprising:
   a processor; and
   a computer readable memory storing computer readable instructions which, when executed, cause the processor to at least:
      identify available network elements within a wireless network of a wireless network provider based on a request from a client; and
      allocate a portion of a control plane and a portion of a data plane of the identified network elements for the virtual private mobile network;
   configure the portion of the control plane of the identified network elements for the virtual private mobile network and the portion of the data plane of the identified network elements by creating a virtual circuit comprising a serving gateway, an Internet protocol network, a wireless base transceiver station, and a packet data network gateway for the virtual private mobile network; and
   enable a mobile device subscribed to a service of the client to wirelessly communicatively couple to the virtual private mobile network by:
      determining whether the mobile device is authorized to access the virtual private mobile network based on a request to connect from the mobile device using an access point name;
      when the mobile device is authorized, forwarding communications from the mobile device received at the wireless base transceiver station to the serving gateway via the virtual circuit; and
      when the mobile device is authorized, routing the communications using the access point name from the serving gateway to the packet data network gateway to route the communications to the Internet Protocol network via the virtual circuit.

10. An apparatus as defined in claim 9, wherein the request instructs the wireless network provider to create the virtual private mobile network for a client from which the request was received.

11. An apparatus as defined in claim 10, wherein the instructions are further to cause the processor to transmit an access point name associated with the virtual private mobile network to the client.

12. An apparatus as defined in claim 9, wherein the network elements include the wireless base transceiver station.

13. An apparatus as defined in claim 12, wherein the instructions are to cause the processor to configure the portion of the data plane of the wireless base transceiver station and the portion of the control plane of the wireless base transceiver station by partitioning a portion of a wireless spectrum provided by the wireless base transceiver station for the virtual private mobile network.

14. An apparatus as defined in claim 9, wherein the instructions are to cause the processor to configure the portion of the data plane of the serving gateway by provisioning a portion of a processing capability of the serving gateway for the virtual private mobile network and configure the portion of the control plane of the serving gateway by associating an access point name to the virtual private mobile network.

15. A tangible computer readable storage device comprising instructions which, when executed, cause a processor to at least:
   access a request from a client, the request including an instruction to create a virtual private mobile network for the client;
   identify available network elements within a wireless network of a wireless network provider based on the request from the client;
   configure a portion of a control plane and a portion of a data plane of the identified network elements for the virtual private mobile network by creating a virtual circuit comprising a serving gateway, an Internet protocol network, a wireless base transceiver station, and a packet data network gateway for the virtual private mobile network; and
   enable user equipment to wirelessly communicatively couple to the virtual private mobile network by:
      determining whether the user equipment is authorized to access the virtual private mobile network based on a request to connect from the user equipment using an access point name;
      if the user equipment is determined to be authorized, forwarding communications from the user equipment received at the wireless base transceiver station to the serving gateway via the virtual circuit; and
      if the user equipment is determined to be authorized, routing the communications using the access point name from the serving gateway to the packet data network gateway to route the communications to the Internet Protocol network via the virtual circuit.

16. A computer readable storage device as defined in claim 15, wherein the instructions, when executed, cause the processor to create the virtual circuit by:
   extending the virtual circuit from the serving gateway to a wireless base transceiver station; and
   extending the virtual circuit from the packet data network gateway to an Internet Protocol network.

17. A computer readable storage device as defined in claim 15, wherein the instructions, when executed, cause the processor to:
   determine the client is to be allocated the wireless base transceiver station and an associated wireless spectrum based on the request; and
   communicatively couple the wireless base transceiver station to the virtual private mobile network.

* * * * *